United States Patent
Cribbs

(10) Patent No.: US 6,239,062 B1
(45) Date of Patent: May 29, 2001

(54) OLEFIN POLYMERIZATION CATALYSTS CONTAINING INDOLYL-AMIDO LIGANDS

(75) Inventor: Leonard V. Cribbs, Hamilton, OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/388,881

(22) Filed: Sep. 2, 1999

(51) Int. Cl.[7] ............... B01J 21/00; B01J 21/06; B01J 23/24; B01J 23/38; B01J 23/46
(52) U.S. Cl. ............ 502/167; 502/103; 502/123; 502/152; 502/155; 502/169; 502/200; 526/128; 526/141; 526/160; 526/943
(58) Field of Search ............ 502/103, 123, 502/152, 158, 167, 169, 200; 526/128, 141, 160, 943

(56) References Cited

U.S. PATENT DOCUMENTS

| | | | |
|---|---|---|---|
| 5,064,802 | 11/1991 | Stevens et al. | 502/155 |
| 5,096,867 | 3/1992 | Canich | 502/103 |
| 5,153,157 | 10/1992 | Hlatky et al. | 502/117 |
| 5,198,401 | 3/1993 | Turner et al. | 502/155 |
| 5,241,025 | 8/1993 | Hlatky et al. | 526/129 |
| 5,278,272 | 1/1994 | Lai et al. | 526/348.5 |
| 5,347,024 | 9/1994 | Nickias et al. | 556/11 |
| 5,495,036 | 2/1996 | Wilson et al. | 556/12 |
| 5,539,124 | 7/1996 | Etherton et al. | 548/402 |
| 5,541,349 | 7/1996 | Wilson et al. | 556/10 |
| 5,637,660 | 6/1997 | Nagy et al. | 526/160 |
| 5,688,880 | 11/1997 | Spencer et al. | 526/127 |
| 5,703,257 | 12/1997 | Rosen et al. | 556/7 |
| 5,942,459 | * 9/1999 | Sugano et al. | 502/117 |

FOREIGN PATENT DOCUMENTS

WOA 96/13529  5/1996  (WO).

* cited by examiner

*Primary Examiner*—Mark L. Bell
*Assistant Examiner*—Michael J. DiVerdi
(74) *Attorney, Agent, or Firm*—Kevin M. Carroll

(57) ABSTRACT

A constrained geometry single-site olefin polymerization catalyst is described. The catalyst comprises an activator and an organometallic compound that includes a Group 3 to 10 transition or lanthanide metal, M, and a multidentate ligand characterized by an indolyl group that is covalently linked to an amido group, wherein the indolyl group is π-bonded to M and the amido group is σ-bonded to M. The indolyl-amido ligand is formed from readily available organic compounds and allows easy synthesis of a constrained geometry catalyst system.

24 Claims, No Drawings

OLEFIN POLYMERIZATION CATALYSTS CONTAINING INDOLYL-AMIDO LIGANDS

FIELD OF THE INVENTION

This invention relates to a catalyst for polymerizing olefins. The catalyst comprises an activator and an organometallic compound that incorporates a multidentate indolyl-amido ligand. The catalyst is easily formed from readily available organic compounds.

BACKGROUND OF THE INVENTION

Many olefin polymerization catalysts are known, including conventional Ziegler-Natta catalysts. While these catalysts are inexpensive, they exhibit low activity, produce polymers having medium to broad molecular weight distributions ($M_w/M_n>4$), and are generally poor at incorporating α-olefin comonomers. To improve polymer properties, highly active single-site catalysts, in particular metallocenes, are beginning to replace Ziegler-Natta catalysts. Although more expensive, the new catalysts give polymers with narrow molecular weight distributions, and good comonomer incorporation, which allows easier production of low-density polymers. One disadvantage of metallocene catalysts is that they tend to produce lower molecular weight polymers at higher temperatures.

Recent attention has focused on developing "constrained geometry" or "open architecture" single-site catalysts. These catalysts, which contain a transition metal bound to a multidentate ligand, are believed to have exposed active sites that impart unique properties to the catalyst. U.S. Pat. Nos. 5,703,257, 5,347,024, 5,096,867, and 5,064,802 disclose constrained geometry catalysts having ligands comprising a substituted or unsubstituted cyclopentadienyl ring that is covalently linked to a divalent ligand group comprising nitrogen, phosphorus, oxygen, or sulfur. The cyclopentadienyl group is π-bonded to the metal and the divalent ligand group is σ-bonded to the transition metal. U.S. Pat. Nos. 5,541,349 and 5,495,036 disclose similar constrained geometry catalysts in which the cyclopentadienyl ring is replaced by non-aromatic dienyl ligands. Further, U.S. Pat. No. 5,688,880 discloses constrained geometry catalysts in which the cyclopentadienyl ring is replaced by a delocalized, π-bonded group.

However, heteroatom-containing π-bonded groups are not disclosed and, in particular, indolyl systems are not disclosed. Indolyl catalyst systems for olefin polymerization are disclosed in U.S. Pat. No. 5,539,124, but the indolyl group is not covalently linked to a divalent ligand group. PCT Intl. Appl. WO 96/13529 discloses monoanionic multidentate ligands having a heteroatom-containing cyclopentadienyl ring substituent and a trivalent amine or phosphine substituent, but dianionic ligands are not disclosed.

Constrained geometry catalysts are believed to have unique properties. U.S. Pat. No. 5,278,272 discloses that ethylene/1-octene copolymers produced by a constrained geometry catalyst have much better processability and higher melt elasticity than similar polymers produced by metallocene catalysts. One significant problem with constrained geometry catalyst systems is that they are difficult to prepare, requiring complicated multi-step synthetic pathways. For example, see Examples 1–3 in U.S. Pat. No. 5,688,880.

A cost-effective route to single-site catalysts starts with readily available organic compounds that can act as stable ligands for transition metals. For example, U.S. Pat. No. 5,637,660 discloses single-site catalysts in which a cyclopentadienyl moiety of a metallocene is replaced by a quinolinyl or pyridinyl ligand. Such a route has not been attempted for constrained geometry single-site catalysts.

In sum, new constrained geometry single-site catalysts are needed. Particularly valuable catalysts would be easily synthesized from readily available starting materials. These catalysts would combine the cost advantages of Zeigler-Natta catalysts with the polymer property advantages of constrained geometry catalysts.

SUMMARY OF THE INVENTION

The invention is a catalyst for polymerizing olefins. The catalyst comprises: (a) an activator; and (b) an organometallic compound comprising a Group 3 to 10 transition or lanthanide metal, M, and a multidentate ligand characterized by an indolyl group that is covalently linked to an amido group, wherein the indolyl group is π-bonded to M and the amido group is σ-bonded to M. The catalyst is easily formed from readily available organic compounds.

DETAILED DESCRIPTION OF THE INVENTION

Catalysts of the invention comprise an activator and an organometallic compound comprising a Group 3 to 10 transition or lanthanide metal, M, and a multidentate ligand characterized by an indolyl group that is covalently linked to an amido group, wherein the indolyl group is π-bonded to M and the amido group is σ-bonded to M.

The metal, M, may be any Group 3 to 10 transition or lanthanide metal. Preferably, the catalyst contains a Group 4 to 6 transition metal; more preferably, the catalyst contains a Group 4 metal such as titanium or zirconium.

The indolyl group can be any substituted or unsubstituted indolyl. Examples of substituted indolyls include 2-tert-butylindolyl, 7-methylindolyl, 3-phenylindolyl, and 4,7-dimethylindolyl. The indolyl group is π-bonded to M such that the pyrrolyl substituent of the indolyl group is bound to M in an $\eta^5$ fashion.

The amido group can be any substituted or unsubstituted amido group that is covalently linked to the indolyl group. Preferred amido groups have hydrogen or a $C_1$–$C_{20}$ hydrocarbyl bound to the nitrogen atom of the amido group. The amido group is σ-bonded to M.

The indolyl group is covalently linked to the amido group. The indolyl and amido groups can be bonded directly to each other, but there is preferably a bridging group. Bridging groups contain at least one nonhydrogen atom. Preferred groups that can be used to bridge the two ligands include methylene, ethylene, 1,2-phenylene, dimethyl silyl, diphenyl silyl, and methyl phenyl silyl. Particularly preferred groups include methylene and ethylene. The amido group is covalently linked to the indolyl group at any position on the indolyl ring. Preferably, the amido group is covalently linked through the pyrrolyl ring of the indolyl group.

The transition or lanthanide metal may also have other ligands. Preferred ligands include halides and $C_1$–$C_{20}$ alkoxy, siloxy, hydrocarbyl, or dialkylamido ligands. Particularly preferred ligands are halides and $C_1$–$C_{20}$ hydrocarbyl or dialkylamido ligands. If the ligand is a $C_1$–$C_{20}$ hydrocarbyl group, it is preferably a group that lacks a hydrogen atom on a carbon that is beta to M. Thus, preferred hydrocarbyl groups include methyl, benzyl, phenyl, neopentyl, or the like.

A preferred catalyst comprises an activator and an organometallic compound of the formula:

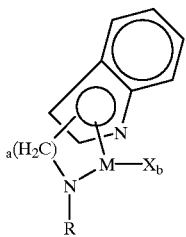

where

M is a Group 4–6 transition metal;

X is hydride, halide, $C_1$–$C_{20}$ alkoxy, siloxy, hydrocarbyl, or dialkylamido, or mixtures thereof;

R is hydrogen or $C_1$–$C_{20}$ hydrocarbyl;

a=1–4; and b=1–4.

A particularly preferred catalyst comprises an activator and an organometallic compound of the formula:

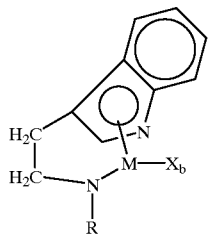

where

M is a Group 4 transition metal;

X is hydride, halide, $C_1$–$C_{20}$ alkoxy, siloxy, hydrocarbyl, or dialkylamido, or mixtures thereof;

R is hydrogen or $C_1$–$C_{20}$ hydrocarbyl; and b=1–2.

The organometallic compound is prepared by any suitable method. In one convenient method, the indole-amine compound is reacted directly with a Group 3–10 transition metal or lanthanide metal, M, hydrocarbyl complex or a Group 3–10 transition metal or lanthanide metal, M, dialkylamido complex in an inert organic solvent. Stoichiometric quantities are typically used. The reactions can occur at room temperature, but a higher temperature of 30° C. to 150° C. is preferred. By-products and solvent are removed by evaporation and the organometallic compound is collected.

The metal hydrocarbyl complex includes any Group 3–10 transition or lanthanide metal that is covalently bound to at least two hydrocarbyl groups. Preferred hydrocarbyl groups include $C_1$–$C_{20}$ hydrocarbyls. Particularly preferred hydrocarbyl groups lack a hydrogen atom on a carbon that is beta to M. Particulary preferred hydrocarbyl groups thus include methyl, benzyl, phenyl, neopentyl, or the like. The metal dialkylamido complex includes any Group 3–10 transition or lanthanide metal that is covalently bound to at least two dialkylamido groups. Preferred dialkylamido groups include $C_1$–$C_{20}$ dialkylamido groups. Particularly preferred dialkylamidos include dimethylamido, diethylamido, and diisopropylamido.

In another convenient method, the indole-amine compound is reacted with two equivalents of a deprotonating base in an inert organic solvent. The deprotonated dianionic indolyl-amido reaction product is then reacted with a Group 3–10 transition metal or lanthanide metal halide complex in an inert organic solvent to form the organometallic compound. The metal halide complex includes any Group 3–10 transition metal or lanthanide metal that is covalently bound to at least two halide atoms. Stoichiometric quantities are typically used. The reactions can occur at room temperature, but a lower temperature of −100° C. to 0° C. is preferred. By-products are removed by filtration, the solvent is evaporated, and the organometallic compound is collected.

The indole-amine compound has an indole group and an amine group. The indole group has hydrogen as the substituent on the nitrogen atom of the indole ring. The indole group can be any substituted or unsubstituted indole. Examples of substituted indoles include 2-tert-butylindole, 7-methylindole, 2-phenylindole, and 4,7-dimethylindole.

The amine group is any amine with at least one hydrogen substituent where the amine is covalently linked to the indole group. The indole and amine groups can be bound directly to each other, but there is preferably a bridging group. Bridging groups contain at least one nonhydrogen atom. Preferred bridging groups include methylene, ethylene, 1,2-phenylene, dimethyl silyl, diphenyl silyl, and methyl phenyl silyl. Particularly preferred groups include methylene and ethylene. The amine group is covalently linked to the indolyl group at any position on the indolyl ring. Preferably, the amine group is covalently linked through the pyrrolyl ring of the indolyl group.

Preferred indole-amine compounds include tryptamines and Nω-methyl tryptamines.

Suitable deprotonating bases include any base that is capable of deprotonating the indole-amine compound to form a dianionic indolyl-amido compound. Preferred bases include alkyl lithiums, Grignard reagents, and lithium dialkylamides. Particularly preferred bases include n-butyl lithium, methylmagnesium bromide, and lithium diisopropylamide.

Suitable inert organic solvents are inert to the deprotonating agent. Preferred solvents include diethyl ether, tetrahydrofuran, hexane, and toluene.

The organometallic compound is combined with an activator to give a catalyst of the invention. Suitable activators include alumoxanes. Preferred alumoxanes are polymeric aluminum compounds represented by the cyclic formula $(R^2$—Al—O$)_s$ or the linear formula $R^2(R^2$—Al—O$)_sAlR^2$ wherein $R^2$ is a $C_1$–$C_5$ alkyl group and s is an integer from 1 to about 20. Preferably, $R^2$ is methyl and s is from about 4 to about 10. Exemplary alumoxane activators are (poly) methylalumoxane (MAO), ethylalumoxane, and diisobutylalumoxane. Optionally, the alumoxane activator is used with a trialkyl or triaryl aluminum compound, which preferably has the formula $AlR^3_3$ where $R^3$ denotes a $C_1$–$C_{20}$ hydrocarbyl.

Suitable activators also include substituted or unsubstituted trialkyl or triaryl boron derivatives, such as tris (perfluorophenyl)borane, and ionic borates and aluminates such as tri(n-butyl)ammonium tetrakis(pentafluorophenyl) borate, trityl tetrakis(pentafluorophenyl)borate or trityl tetrakis(pentafluorophenyl)aluminate. The ionic borates and aluminates ionize the neutral organometallic compound to produce an active catalyst for olefin polymerization. See, for instance, U.S. Pat. Nos. 5,153,157, 5,198,401, and 5,241,025, all of which are incorporated herein by reference.

The organometallic compound and the activator are injected into a reactor containing the olefin monomer. The organometallic compound and the activator can be premixed before injecting into the reactor. Alternatively, the organometallic compound and the activator can be injected separately. If the organometallic compound and the activator are injected separately into the reactor, the activator is preferably injected first. The molar ratio of activator to organometallic compound is preferably from about 1:1 to about 15,000:1.

The organometallic compound and the activator may be used with a support such as silica, alumina, magnesia, or titania. A support may be required for some processes. For example, a support is generally needed in gas phase and slurry polymerization processes to control polymer particle size and to prevent fouling of the reactor walls. In one method, the organometallic compound is dissolved in a solvent and is deposited onto the support by evaporating the solvent. An incipient wetness method can also be used. The activator can also be deposited on the support or it can be introduced into the reactor separately from the supported organometallic compound.

The catalyst is particularly valuable for polymerizing olefins, preferably α-olefins. Suitable olefins include, for example, ethylene, propylene, 1-butene, 1-hexene, 1-octene, and the like, and mixtures thereof. The catalyst is valuable for copolymerizing ethylene with α-olefins or di-olefins (e.g., 1,3-butadiene, 1,4-hexadiene, 1,5-hexadiene).

The catalysts can be used in a variety of polymerization processes. They can be used in a liquid phase (slurry, solution, suspension, bulk), high-pressure fluid phase, or gas phase polymerization processes, or a combination of these. The pressure in the polymerization reaction zones typically ranges from about 15 psia to about 15,000 psia, and the temperature usually ranges from about −100° C. to about 300° C.

The following examples merely illustrate the invention. Those skilled in the art will recognize many variations that are within the spirit of the invention and scope of the claims.

EXAMPLE 1

This example describes the synthesis of (Nω-methyl tryptamine) zirconium dichloride of the structural formula:

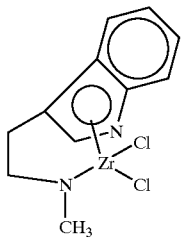

3.0 M methylmagnesium bromide in diethyl ether (6.7 mL, 20 mmol) is added to Nω-methyl tryptamine (1.74 g, 10 mmol) dissolved in 40 mL of diethyl ether at 0° C. This mixture is added via cannula to a stirred slurry of zirconium tetrachloride (2.33 g, 10 mmol) and 100 mL of dry diethyl ether at 0° C. The reaction mixture is stirred an additional 2 hours at 0° C., then is allowed to warm to room temperature. The solution is filtered to remove the magnesium salt by-product, and the volatiles are then removed with vacuum to isolate the resultant solid.

EXAMPLE 2

This example describes the synthesis of (tryptamine) vanadium chloride of the structural formula:

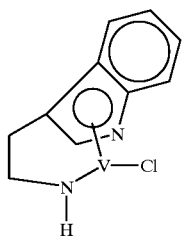

1.6 M n-butyllithium in hexane (12.5 mL, 20 mmol) is added to tryptamine (1.6 g, 10 mmol) dissolved in 40 mL of tetrahydrofuran at −78° C. After warming to room temperature, this mixture is added via cannula to vanadium trichloride tetrahydrofuran complex (VCl$_3$·3THF, 3.74 g, 10 mmol) in 100 mL of dry tetrahydrofuran at −78° C. The reaction mixture is stirred an additional 2 hours at −78° C., then is allowed to warm to room temperature. The solution is filtered to remove the lithium salt by-product, and the volatiles are then removed with vacuum to isolate the resultant solid.

EXAMPLE 3

This example describes the synthesis of (Nω-methyl tryptamine) chromium chloride of the structural formula:

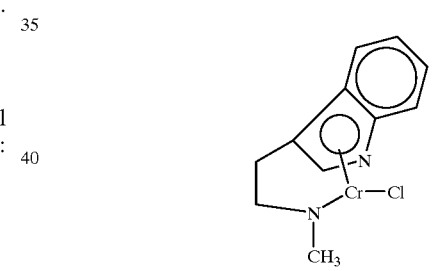

1.6 M n-butyllithium in hexane (12.5 mL, 20 mmol) is added to Nω-methyl tryptamine (1.74 g, 10 mmol) dissolved in 40 mL of tetrahydrofuran at −78° C. After warming to room temperature, this mixture is added via cannula to chromium trichloride tetrahydrofuran complex (CrCl$_3$·3THF, 3.75 g, 10 mmol) in 100 mL of dry tetrahydrofuran at −78° C. The reaction mixture is stirred an additional 2 hours at −78° C., then is allowed to warm to room temperature. The solution is filtered to remove the lithium salt by-product, and the volatiles are then removed with vacuum to isolate the resultant solid.

EXAMPLE 4

This example describes the synthesis of (tryptamine) ruthenium chloride of the structural formula:

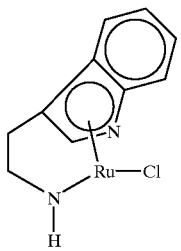

3.0 M methylmagnesium bromide in diethyl ether (6.7 mL, 20 mmol) is added to tryptamine (1.6 g, 10 mmol) dissolved in 40 mL of diethyl ether at 0° C. This mixture is added via cannula to a stirred slurry of ruthenium trichloride (2.07 g, 10 mmol) and 100 mL of dry diethyl ether at 0° C. The reaction mixture is stirred an additional 2 hours at 0° C., then is allowed to warm to room temperature. The solution is filtered to remove the magnesium salt by-product, and the volatiles are then removed with vacuum to isolate the resultant solid.

EXAMPLE 5

This example describes the synthesis of (Nω-methyl tryptamine) zirconium dibenzyl of the structural formula:

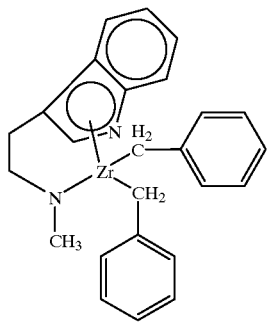

Nω-methyl tryptamine (1.74 g, 10 mmol) is added with stirring to tetrabenzylzirconium (4.55 g, 10 mmol) in 100 mL of diethyl ether. The resulting mixture is maintained at reflux for 16 hours and is then cooled to room temperature. The volatiles are removed and the resultant solid is isolated.

I claim:

1. A catalyst which comprises:
   (a) an activator; and
   (b) an organometallic compound comprising a Group 3 to 10 transition or lanthanide metal, M, and a multidentate ligand characterized by an indolyl group that is covalently linked to an amido group, wherein the indolyl group is π-bonded to M and the amido group is σ-bonded to M.
2. The catalyst of claim 1 wherein the transition metal is a Group 4–6 transition metal.
3. The catalyst of claim 1 wherein the transition metal is a Group 4 transition metal.
4. The catalyst of claim 1 wherein the activator is selected from the group consisting of alumoxanes, alkylaluminum compounds, alkyl and arylboranes, ionic borates, and ionic aluminates.
5. The catalyst of claim 1 wherein the multidentate ligand derives from a member selected from the group consisting of substituted and unsubstituted tryptamines and Nω-methyl tryptamines.
6. A supported catalyst of claim 1.
7. A catalyst which comprises:
   (a) an activator; and
   (b) an organometallic compound of the formula:

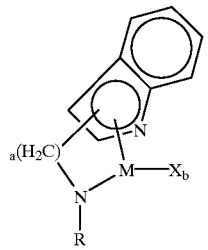

wherein
M is a Group 4–6 transition metal;
X is hydride, halide, $C_1$–$C_{20}$ alkoxy, siloxy, hydrocarbyl, or dialkylamido, or mixtures thereof;
R is hydrogen or $C_1$–$C_{20}$ hydrocarbyl;
a=1–4; and
b=1–4.

8. The catalyst of claim 7 wherein the transition metal is a Group 4 transition metal.
9. The catalyst of claim 7 wherein the activator is selected from the group consisting of alumoxanes, alkylaluminum compounds, alkyl and arylboranes, ionic borates, and ionic aluminates.
10. A supported catalyst of claim 7.
11. A catalyst which comprises:
    (a) an activator; and
    (b) an organometallic compound of the formula:

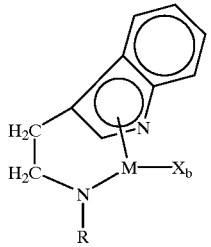

wherein
M is a Group 4 transition metal;
X is hydride, halide, $C_1$–$C_{20}$ alkoxy, siloxy, hydrocarbyl, or dialkylamido, or mixtures thereof;
R is hydrogen or $C_1$–$C_{20}$ hydrocarbyl; and
b=1–2.

12. The catalyst of claim 11 wherein the activator is selected from the group consisting of alumoxanes, alkylaluminum compounds, alkyl and arylboranes, ionic borates, and ionic aluminates.
13. A supported catalyst of claim 11.
14. A method which comprises polymerizing an olefin in the presence of the catalyst of claim 1.
15. The method of claim 14 wherein the olefin is ethylene or a mixture of ethylene and a $C_3$–$C_{10}$ α-olefin.
16. A method which comprises polymerizing an olefin in the presence of the catalyst of claim 7.
17. The method of claim 16 wherein the olefin is ethylene or a mixture of ethylene and a $C_3$–$C_{10}$ α-olefin.
18. A method which comprises polymerizing an olefin in the presence of the catalyst of claim 11.

19. The method of claim 18 wherein the olefin is ethylene or a mixture of ethylene and a $C_3$–$C_{10}$ α-olefin.

20. The catalyst of claim 1 wherein the organometallic compound is prepared by:
   (a) reacting an indole-amine compound with two equivalents of a deprotonating base in an inert organic solvent; and
   (b) reacting the product of step (a) with a Group 3–10 transition or lanthanide metal halide complex in an inert organic solvent.

21. The catalyst of claim 20 wherein the indole-amine compound is selected from the group consisting of substituted and unsubstituted tryptamines and Nω-methyl tryptamines.

22. The catalyst of claim 20 wherein the inert organic solvent is selected from the group consisting of diethyl ether, tetrahydrofuran, hexane, and toluene.

23. The catalyst of claim 20 wherein the deprotonating base is selected from the group consisting of alkyl lithiums, Grignard reagents, and lithium dialkylamides.

24. The catalyst of claim 1 wherein the organometallic compound is prepared by reacting an indole-amine compound with one equivalent of a metal complex selected from the group consisting of Group 3–10 transition or lanthanide metal hydrocarbyl complexes and Group 3–10 transition metal or lanthanide metal dialkylamido complexes.

* * * * *